(12) United States Patent
Khabashesku et al.

(10) Patent No.: US 7,820,130 B2
(45) Date of Patent: Oct. 26, 2010

(54) FUNCTIONALIZATION OF NANODIAMOND POWDER THROUGH FLUORINATION AND SUBSEQUENT DERIVATIZATION REACTIONS

(75) Inventors: Valery N. Khabashesku, Houston, TX (US); Yu Liu, Houston, TX (US); John L. Margrave, Bellaire, TX (US); Mary Lou Margrave, legal representative, Bellaire, TX (US)

(73) Assignee: William Marsh Rice University, Houston, TX (US)

( * ) Notice: Subject to any disclaimer, the term of this patent is extended or adjusted under 35 U.S.C. 154(b) by 1295 days.

(21) Appl. No.: 10/996,869

(22) Filed: Nov. 24, 2004

(65) Prior Publication Data

US 2005/0158549 A1 Jul. 21, 2005

Related U.S. Application Data

(60) Provisional application No. 60/525,588, filed on Nov. 26, 2003.

(51) Int. Cl.
*C01B 31/06* (2006.01)
(52) U.S. Cl. .................................................. 423/446
(58) Field of Classification Search ................ 423/446; 117/79, 929; 264/84; 425/77
See application file for complete search history.

(56) References Cited

U.S. PATENT DOCUMENTS

2001/0031900 A1* 10/2001 Margrave et al. ............ 570/126

OTHER PUBLICATIONS

Ando, et al., Diffuse Reflectance Fourier-transform Infrared Study of the Plasma-fluorination of Diamond Surfaces using a Microwave Discharge in CF4, J. Chem. Soc. Faraday Trans. 1993; 89(16): 3105-3109.*
Ando, et al., Direct interaction of elemental fluorine with diamond surfaces, Diamond and Related Materials 1996; 5: 1021-1025.*
Kealey, et al., Fluorination of polycrystalline diamond films and powders. An investigation using FTIR spectroscopy, SEM, energy-filtered TEM, XPS and fluorine-18 radiotracer methods, J. Mater. Chem. 2001; 11: 879-886.*
Liu, et al., Functionalization of Nanoscale Diamond Powder: Fluoro-, Alkyl-, Amino-, and Amino Acid-Nanodiamond Derivatives, Chem. Mater. 2004; 16: 3924-3930.*
Rice Quantum Institute's Summer Colloquium (Aug. 9, 2002).*
Smentkowski, et al., Fluorination of diamond surfaces by irradiation of perfluorinated alkyl iodides, Science 1996; 271(5246): 193.*
Ando, et al., Direct interaction of elemental fluorine with diamond surfaces, Diamond and Related Materials 1996; 5: 1021-1025.*
Shenderova, et al., Carbon Nanostructures, Critical Reviews in Solid State and Materials Science 2002; 27: 227-356.*

(Continued)

*Primary Examiner*—Stanley S. Silverman
*Assistant Examiner*—Daniel C. McCracken
(74) *Attorney, Agent, or Firm*—Winstead PC

(57) ABSTRACT

The present invention is directed to functionalized nanoscale diamond powders, methods for making such powders, applications for using such powders, and articles of manufacture comprising such powders. Methods for making such functionalized nanodiamond powders generally comprise a fluorination of nanodiamond powder. In some embodiments, such methods comprise reacting fluorinated nanodiamond powder with a subsequent derivatization agent, such as a strong nucleophile.

27 Claims, 9 Drawing Sheets

Scheme 1

OTHER PUBLICATIONS

Bondar', et al., Use of Nanodiamond Particles for Rapid Isolation of Recombinant Apooberlin from *Escherichia coli*, Doklady Biochemistry 2000; 373: 129-131.*

Wilks, et al., Properties and Applications of Diamond, Butterworth, Oxford, England (1997).

Pierson, Handbook of Carbon, Graphite, Diamond and Fullerenes, Noyes Publ. Park Ridge, New Jersey, USA (1993).

Shenderova et al., "Carbon nanostructures", 27 Critical Reviews in Solid State and Materials Sciences (2002) p. 227.

Dolmatov, "Detonation synthesis ultradispersed diamonds: properties and applications", 70 Russian Chemical Reviews (2001), p. 607.

Greiner et al., "Diamonds in detonation soot", 333 Nature (1988), p. 440.

Kuznetsov et al., "Effect of explosion conditions on the structure of detonation soots . . . ", 32 Carbon (1994), p. 873.

Alimova et al., "Electrophoresis of nanodiamond powder for cold cathode fabrication", 17(2) J. Vac. Sci. Technol. B (1999), pp. 715-718.

Show et al., "Characterization an electrochemical responsiveness of boron-doped nanocrystalline . . . ", 15 Chem. Mater. (2003), p. 879-888.

Choi et al., "Field emission from silicon and molybdenum tips coated with diamond powder by dielectrophoresis", 69 Appl. Phys. Lett. (1996), p. 720-722.

Ralchenko et al., "Diamond-carbon nanocomposites: application for diamond film deposition . . . " 8 Diamond Relat. Mater. (1999), p. 1496-1501.

Jiang et al., "Structural characteristics and field electron emission properties of nano-diamond/carbon films", 236 J. Cryst. Growth (2002), p. 577-582.

Wang et al., "CVD polycrystalline diamond high-Q micromechanical resonators", Proc. of The Fifteenth IEEE Internat. Conf. On Micro Electromechanical Systems (2002), p. 657-660.

Sekaric et al., "Nanomechanical resonant structures in nanocrystalline diamond", 81 Appl. Phys. Lett. (2002), pp. 4455-4457.

Philip et al., "Elastic, mechanical, and thermal properties of nanocrystalline diamond films", 93 J. Appl. Phys. (2003), p. 2164-2171.

Yang et al., "DNA-modified nanocrystalline diamond thin-films as stable, biologically active substrates", 1 Nature Mater. (2002), p. 253-257.

Jiang et al., "FTIR studies on the spectral changes of the surface functional groups . . . ", 92 J. Chem. Soc., Faraday Trans. (1996), p. 3401-5.

Hamers et al., "Cycloaddition chemistry of organic molecules with semiconductor surfaces", 33 Acc. Chem. Res. (2000), p. 617-624.

Bent et al., "Organic functionalization of group IV semiconductor surfaces: principles, examples, applications and prospects", 500 Surf. Sci. (2002), p. 879-903.

Hukka et al., "Chemisorption of hydrogen on the diamond . . . ", 98 J. Phys. Chem. (1994), p. 12420-12430.

Hovis et al., "Cycloaddition chemistry at surfaces: reaction of alkenes with the diamond(001)-2x1 surface", 122 J. Am. Chem. Soc. (2000), p. 732-733.

Wang et al., "Functionalization of diamond(001) by Diels-Alder chemistry", 122 J. Am. Chem. Soc. (2000), p. 744-745.

Fitzgerald et al., "Functionalization of diamond(001) by cycloaddition of butadiene: first principles theory", 122 J. Am. Chem. Soc. (2000), p. 12334-12339.

Hossain et al., "Diels-Adler reaction on the clean diamond(100)2x1 surface", 38 Jpn. J. Appl. Phys. (1999), p. L1496-1498.

Miller et al., "Photochemical modification of diamond surfaces", 12 Langmuir (1996), p. 5809-5817.

Smentkowski et al., "Fluorination of diamond surfaces by irradiation of perfluorinated alkyl iodides", 271 Science (1996), p. 193.

Kim et al., "Photochemical attachment of fluorobutyl moieties on a diamond (110)-oriented surface . . . ", 102 J. Phys. Chem. B (1998), p. 9290-9296.

Nakamura et al., "Chemical modification of diamond powder using photolysis of perfluoroazooctane", Chem. Commun. (2003), p. 900-901.

Ando et al., "Direct interaction of elemental fluorine with diamond Surfaces", 5 Diamond Relat. Mater. (1996), p. 1021-1025.

Kealey et al., "Fluorination of polycrystalline diamond films and powders . . . ", 11 J. Mater. Chem. (2001), p. 879-886.

Ando et al., "Diffuse reflectance Fourier-transform infrared study of the plasma fluorination of diamond surfaces . . . ", 89 J. Chem. Soc., Faraday Trans. (1993), p. 3105-3109.

Touhara et al., "Property control of carbon materials by fluorination", 38 Carbon (2000), p. 241-267.

Ferro et al., "Physicochemical properties of fluorinated diamond electrodes", 107 J. Phys. Chem. B (2003), p. 7567-7573.

Ferro et al., "The 5-V window of polarizability of fluorinated diamond electrodes in aqueous solutions", 75 Anal. Chem. (2003), p. 7040-7042.

Roeges, N., "Guide to the Complete Interpretation of Infrared Spectra of Organic Structures", Wiley Publ., Chichester, England (1994).

Kawasaki et al., "Crystal structures of the fluorinated fullerenes $C_{60}F_{36}$ and $C_{60}F_{48}$" 103 J. Phys. Chem. B (1999), p. 1223.

Khabashesku et al., "Fluorination of single-wall carbon nanotubes and subsequent derivatization reactions", 35 Acc. Chem. Res. (2002), p. 1087-1095.

Khabashesku, V. N. Chemistry of Carbon Nanotubes in Encyclopedia of Nanoscience and Nanotechnology, Ed. S. Nalwa, American Scientific Publishers, Los Angeles, (2004), vol. 1, p. 849.

The Aldrich Library of Infrared Spectra, Second Edition. Ed. C. J. Pouchert, Milwaukee, Wisconsin (1975).

Stenhagen, et al., "Atlas of Mass Spectral Data", 1 Interscience Publ., (1969).

B.D. Cullity, "Elements of X-Ray Diffraction", Second Edition (Boston: Addison-Wesley, 1978), p. 102.

Rice Quantum Institute's Summer Colloquium, Aug. 9, 2002.

Liu, "Functionalization of Nanoscale Diamond Powder: Fluoro-, Alkyl-, Amino Acid-Nanodiamond Derivatives", Chem. Mater. 2004;16:3924-3930.

Liu, Y., N. Agrawal, Z. Gu, H. Peng, V.N. Khabashesku, and J.L. Margrave. "Fluorination of Nanodiamond." PowerPoint Presentation Slides. Aug. 9, 2002.

Khabashesku, V.N. "Functionalization of Carbon Nanomaterials for Bio-Medical Applications." PowerPoint Presentation Slides. Sep. 24, 2003.

* cited by examiner

Scheme 1

FUNCTIONALIZATION OF NANODIAMOND POWDER THROUGH FLUORINATION AND SUBSEQUENT DERIVATIZATION REACTIONS

CROSS REFERENCE TO RELATED APPLICATIONS

The present Application is related to commonly assigned co-pending U.S. Provisional Patent Application Ser. No. 60/525,588, filed Nov. 26, 2003.

The present invention was made with support from the Texas Higher Education Coordinating Board's Advanced Technology Program, Grant No. 003604-026-2001; and the Robert A. Welch Foundation, Grant No. C-0109.

FIELD OF THE INVENTION

This invention relates generally to nanoscale diamond powder, and specifically to surface-functionalized nanoscale diamond powder.

BACKGROUND OF THE INVENTION

Diamond is an extremely sought after material due to its combination of extreme hardness, chemical inertness, low electrical and high thermal conductivities, wide optical transparency, and other unique properties [Wilks, E.; Wilks, J. *Properties and Applications of Diamond*, Butterworth, Oxford, England, 1997; Pierson, H. O. *Handbook of Carbon, Graphite, Diamond and Fullerenes*, Noyes Publ. Park Ridge, N.J., USA, 1993]. Diverse applications of diamond materials have been facilitated by the mid 1950s discovery and subsequent development of processes for large-scale production of synthetic diamonds [Pierson, H. O. *Handbook of Carbon, Graphite, Diamond and Fullerenes*, Noyes Publ. Park Ridge, N.J., USA, 1993]. These industrial processes primarily employ high pressure-high temperature technologies to produce single-crystalline diamonds, while on the laboratory scale, methods of physical and chemical vapor deposition of polycrystalline diamond films are commonly used. These diamond materials have been traditionally applied as abrasives and cutting tools and also as substrates in microelectronics.

In recent years, a number of synthetic methods for the preparation of nanocrystalline diamond, "nanodiamond" (ND), in the form of films and powders, have been developed [Shenderova et al., *Critical Reviews in Solid State and Materials Sciences* 2002, 27, 227; Dolmatov, *Russian Chemical Reviews* 2001, 70, 607]. Particularly, detonation synthesis, from powerful explosive mixtures [Greiner et al., *Nature*, 1988, 333, 440; Vereschagin et al., *Dia. Relat. Mater.* 1993, 3, 160; Kuznetsov et al., *Carbon*, 1994, 32, 873] has made such nanodiamond powder commercially available in ton quantities which has enabled many engineering applications and has expanded the application scope of diamond [Dolmatov, *Russian Chemical Reviews* 2001, 70, 607].

Nanodiamond (ND) powders prepared by explosive techniques present a novel class of nanomaterials possessing unique surface properties. Due to the very small particle size (2-10 nm), a larger percentage of atoms in nanodiamonds contribute to the defect sites on grain boundaries than in single crystal natural or microcrystalline synthetic diamonds. For example, in individual 4.3 nm spherical particles of ND comprising about 7200 carbon atoms, nearly 1100 atoms are located at the surface [Shenderova et al., *Critical Reviews in Solid State and Materials Sciences* 2002, 27, 227]. For this reason, the surface modifications of the nanosize diamond grains can affect the bulk properties of this material more strongly than those of micro- and macroscale diamonds. For example, nanodiamond powders can form good abrasive pastes and suspensions for high-precision polishing; nano-diamond-polymer composites are applied for manufacturing aircraft, cars and ships, as well as in hard and wear-resistant surface coatings. They are considered potential medical agents due to their high adsorption capacity, high specific surface area, and chemical inertness [Shenderova et al., *Critical Reviews in Solid State and Materials Sciences* 2002, 27, 227; Dolmatov, *Russian Chemical Reviews* 2001, 70, 607]. Applications of nanodiamond thin films have been demonstrated in the fabrication of cold cathodes, field emission displays [Alimova et al., *J. Vac. Sci. Technol. B* 1999, 17, 715; Show et al., *Chem. Mater.* 2003, 15, 879; Choi et al., *Appl. Phys. Lett.* 1996, 68, 720; Ralchenko et al., *Diamond Relat. Mater.* 1999, 8, 1496; Jiang et al., *J. Cryst. Growth* 2002, 236, 577], nanomechanical and nanoelectromechanical resonant structures (NEMS) [Wang et al., *Proc. of The Fifteenth IEEE Internat. Conf. On Micro Electromechanical Systems*, 2002, 657; Sekaric et al., *Appl. Phys. Lett.* 2002, 81, 4455; Philip et al., *J. Appl. Phys.* 2003, 93, 2164], and were suggested for the design of biosensors as stable biologically active substrates after DNA-modification [Yang et al., *Nature Mater.* 2002, 1, 253].

In order to minimize surface energy, individual ND particles (crystallites) of 4-6 nm size structurally self-organize into clusters or primary aggregates of 20-30 mm size. These, in turn, form larger weakly bonded secondary aggregates ranging from hundreds of nanometers to micron sizes. This agglomeration is likely facilitated by surface functional groups, such as —OH, —COOH, —$SO_3H$, and —$NH_2$, which are created along with other functionalities by chemical treatment processing of detonation-synthesized ND [Shenderova et al., *Critical Reviews in Solid State and Materials Sciences* 2002, 27, 227; Jiang et al., *J. Chem. Soc., Faraday Trans.* 1996, 92, 3401] and participate in the formation of hydrogen bonds between nanodiamond clusters. However, for advanced applications of ND powder (e.g., in higher precision polishing compositions, nanoengineered electronic devices, polymer and ceramic composites, and bio-medical systems), the reduction of aggregate sizes to below 200 nm, and ultimately even to single clusters or particles, and the availability of specific functional groups on the surface is highly desirable. These functional groups can also serve as binding sites for covalent integration of ND into polymer structures and provide for improved solubility of ND powder in common solvents. Surface modification of the ND powder particles through a selective surface chemistry should be instrumental in approaching these goals.

Diamond surface modification has been studied during the past decade [Yang et al., *Nature Mater.* 2002, 1, 253; Hamers et al., *Acc. Chem. Res.* 2000, 33, 617; Bent et al., *Surf. Sci.* 2002, 500, 879; Hukka et al., *J. Phys. Chem.* 1994, 98, 12420; Hovis et al., *J. Am. Chem. Soc.* 2000, 122, 732; Wang et al., *J. Am. Chem. Soc.* 2000, 122, 744; Fitzgerald et al., *J. Am. Chem. Soc.* 2000, 122, 12334; Hossain et al., *Jpn. J. Appl. Phys.* 1999, 38, L1496; Miller et al., *Langmuir* 1996, 12, 5809; Smentkowski et al., *Science* 1996, 271, 193; Kim et al., *J. Phys. Chem. B* 1998, 102, 9290; Nakamura et al., *Chem. Commun.* 2003, 900] and fluorination has been regarded as an efficient way to modify and control diamond's surface properties [Smentkowski et al., *Science* 1996, 271, 193; Ando et al., *Diamond Relat. Mater.* 1996, 5, 1021; Kealey et al., *J. Mater. Chem.* 2001, 11, 879; Ando et al., *J. Chem. Soc., Faraday Trans.* 1993, 89, 3105; Touhara et al., *Carbon* 2000, 38, 241; Ferro et al., *J. Phys. Chem. B* 2003, 107, 7567; Ferro et al., *Anal. Chem.* 2003, 75, 7040]. However, all previous work has been done either on larger size (micronscale) polycrystalline diamond [Miller et al., *Langmuir* 1996, 12, 5809; Nakamura et al., *Chem. Commun.* 2003, 900; Ando et al., *Diamond Relat. Mater.* 1996, 5, 1021; Kealey et al., *Mater. Chem.* 2001, 11, 879] or on thin films [Yang et al., *Nature Mater.* 2002, 1, 253; Hamers et al., *Acc. Chem. Res.* 2000, 33, 617; Bent, *Surf. Sci.* 2002, 500, 879; Hukka et al., *J. Phys. Chem.* 1994, 98, 12420; Hovis et al., *J. Am. Chem. Soc.* 2000, 122, 732; Wang et al., *J. Am. Chem. Soc.* 2000, 122, 744; Fitzgerald et al., *J. Am. Chem. Soc.* 2000, 122, 12334. Hossain et al., *Jpn. J. Appl. Phys.* 1999, 38, L1496; Smentkowski et al., *Science* 1996, 271, 193. Kim et al., *J. Phys. Chem. B* 1998, 102, 9290; Ando et al., *J. Chem. Soc., Faraday Trans.* 1993, 89, 3105] grown in vacuum chambers, and no further chemistry (e.g., chemistry utilizing the C—F bond reactivity in particular) was pursued after fluorination.

In view of the foregoing, functionalized nanodiamond powder will likely extend the utility of nanodiamond powder, and methods of making such functionalized nanodiamond powder will be in great demand.

BRIEF DESCRIPTION OF THE INVENTION

The present invention is directed to functionalized nanoscale diamond powders, methods for making such powders, applications for using such powders, and articles of manufacture comprising such powders. The present invention is also directed to the chemical routes used in the making of such functionalized nanoscale diamond powders. The terms "functionalized" and "derivatized" will be used synonymously herein.

As described herein, Applicants have developed chemical routes for selective functionalization of nanodiamond (ND) powders. These routes are based on covalent modification of the nanodiamond particle surface by direct fluorination to form a "fluoronanodiamond" in which fluorine can be displaced by a variety of organic groups, e.g., alkyl, aryl, or those terminated with hydroxyl, carboxyl or amino moieties, to produce a series of nanodiamond derivatives.

Nanodiamond powder is generally described as diamond powder comprising primary crystallites or particles with diameters in the range of 2 to 10 nm. These particles, however, can self-organize into primary aggregates of 20-30 nm in size, which in turn form larger weakly bonded secondary aggregates ranging in size from hundreds of nanometers to micrometers.

In some embodiments, the functionalized nanodiamond powder, wherein the diamond nanoparticulate surface is derivatized with functional moieties selected from the group consisting of fluorine atoms, alkyl species, amino species, amino acid species, and combinations thereof. In some embodiments, such functional moieties impart the powder with improved solubility in polar organic solvents and reduced particle agglomeration—relative to pristine nanodiamond. Such functionalized nanodiamond powder has utility in a number of applications including, but not limited to, abrasives, nanodiamond-polymer composites, coatings, adsorbants, thermal management fluids, field emission displays, nanoelectromechanical systems, biosensors, vehicles for drug delivery, and combinations thereof.

Methods for functionalizing nanodiamond generally comprise (a) providing a quantity of nanodiamond, and (b) fluorinating the surface of the nanodiamond powder to yield fluorinated nanodiamond powder. Typically, this fluorinating comprises contacting the nanodiamond powder with fluorine gas ($F_2$) at elevated temperatures for a reaction duration. It is generally observed that such fluorination of nanodiamond powder proceeds more readily than does fluorination of microscale diamond powder. Hydrogen gas may also be added in substoichiometric amounts to provide for hydrogen fluoride (HF) in the reaction chamber. While this fluorinated nanodiamond powder is itself a useful end product, in some embodiments, it is used as a precursor for further functionalization/derivatization.

Because of the small particulate size of nanodiamond powder, a high percentage of the carbons of which the diamonds are comprised reside at the surface. Consequently, in some embodiments, the fluorinated nanodiamond, or "fluorodiamond," powder described herein can comprise a fluorine content in excess of 5 atomic (at.) % of the total mass of the powder.

Generally, the fluorinating step involves a reaction temperature between about 50° C. and about 500° C., and typically between about 150° C. and about 470° C. Reaction durations for the fluorinating step typically range from about 60 minutes to about 2 days. In some embodiments, the step of fluorinating is done with a flow reactor system that is vented to the atmosphere. In some or other embodiments, the fluorine gas is diluted with an inert gas (e.g., helium, He).

In some embodiments, the fluorinated nanodiamond powder is reacted with a subsequent derivatizing agent to further tailor the surface properties of the functionalized nanodiamond. Suitable subsequent derivatizing agents include, but are not limited to, alkyllithium species, Grignard reagents, amines, diamines, amino acids, and combinations thereof, wherein the subsequently derivatized nanodiamond powder is correspondingly imparted with functional moieties such as alkyl species, amino species, amino acid species, and combinations thereof. Additionally, some fluorine may remain on the surface of the subsequently derivatized nanodiamond powder.

In some embodiments, the functionalized nanodiamond powder (including subsequently-derivatized nanodiamond powder) is blended with a polymeric material for the purpose of imparting the polymer host with the unique properties of the nanodiamond powder. Functional moieties on the nanodiamond powder surface can greatly facilitate this blending into polymeric matrices. In some embodiments, when appropriate functional groups are present, there can be covalent bonding between the functionalized nanodiamond powder and the polymer host matrix.

In some embodiments, the functionalized nanodiamond powder is defunctionalized. This might be done, for example, after some processing step requiring the functionalization, but which in the final product it is unnecessary or undesired. Such defunctionalizations can be done thermally (e.g., 25° C. to 800° C.) in an inert atmosphere, or chemically (e.g., reacting fluorinated nanodiamond with a reducing agent like hydrazine).

In some embodiments, the functionalized nanodiamond powders of the present invention are dispersed and/or suspended in a solvent. Such solvent products are termed "suspensions/solutions" because of the ambiguity in assigning them as one or the other (the particles are too small to exhibit a Tyndall effect).

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
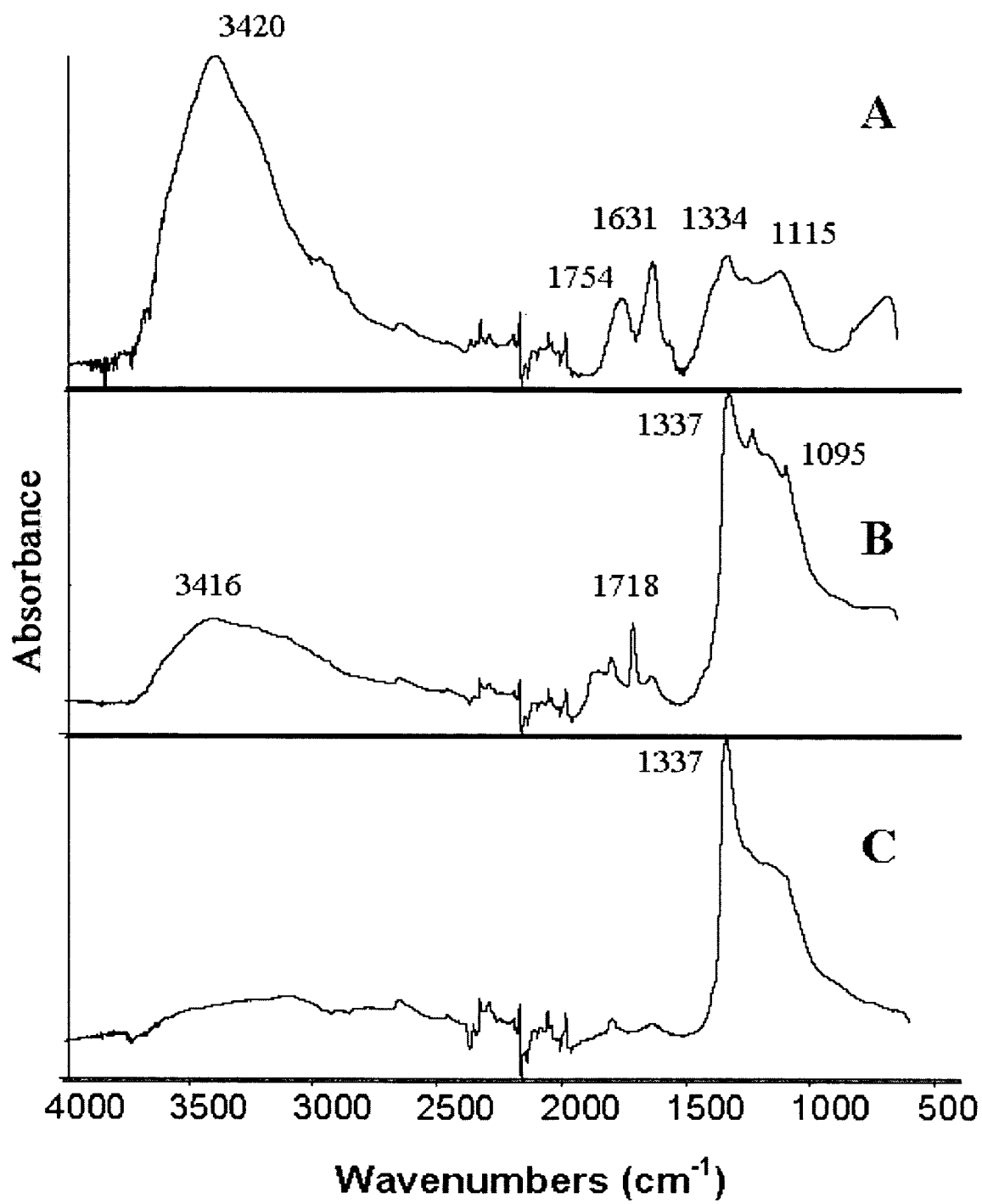
FIG. 1 depicts ATR-FTIR spectra of nanodiamond powder, where (A) is pristine, and (B) and (C) have been fluorinated at temperatures of 150° C. and 310° C., respectively.

In the following description, specific details are set forth such as specific quantities, sizes, etc. so as to provide a thorough understanding of embodiments of the present invention. However, it will be obvious to those skilled in the art that the present invention may be practiced without such specific details. In many cases, details concerning such considerations and the like have been omitted inasmuch as such details are not necessary to obtain a complete understanding of the present invention and are within the skills of persons of ordinary skill in the relevant art.

Referring to the drawings in general, it will be understood that the illustrations are for the purpose of describing a particular embodiment of the invention and are not intended to limit the invention thereto.

The present invention is directed to functionalized nanoscale diamond powders, methods for making such powders, applications for using such powders, and articles of manufacture comprising such powders. The terms "functionalized" and "derivatized" will be used synonymously herein.

As described herein, Applicants have developed chemical routes for selective functionalization of nanodiamond (ND) powders. These routes are based on covalent modification of the nanodiamond particle surface by direct fluorination to form a "fluoronanodiamond" in which fluorine can be displaced by a variety of organic groups, e.g., alkyl, aryl, or those terminated with hydroxyl, carboxyl or amino moieties, to produce a series of nanodiamond derivatives.

Figure 9:
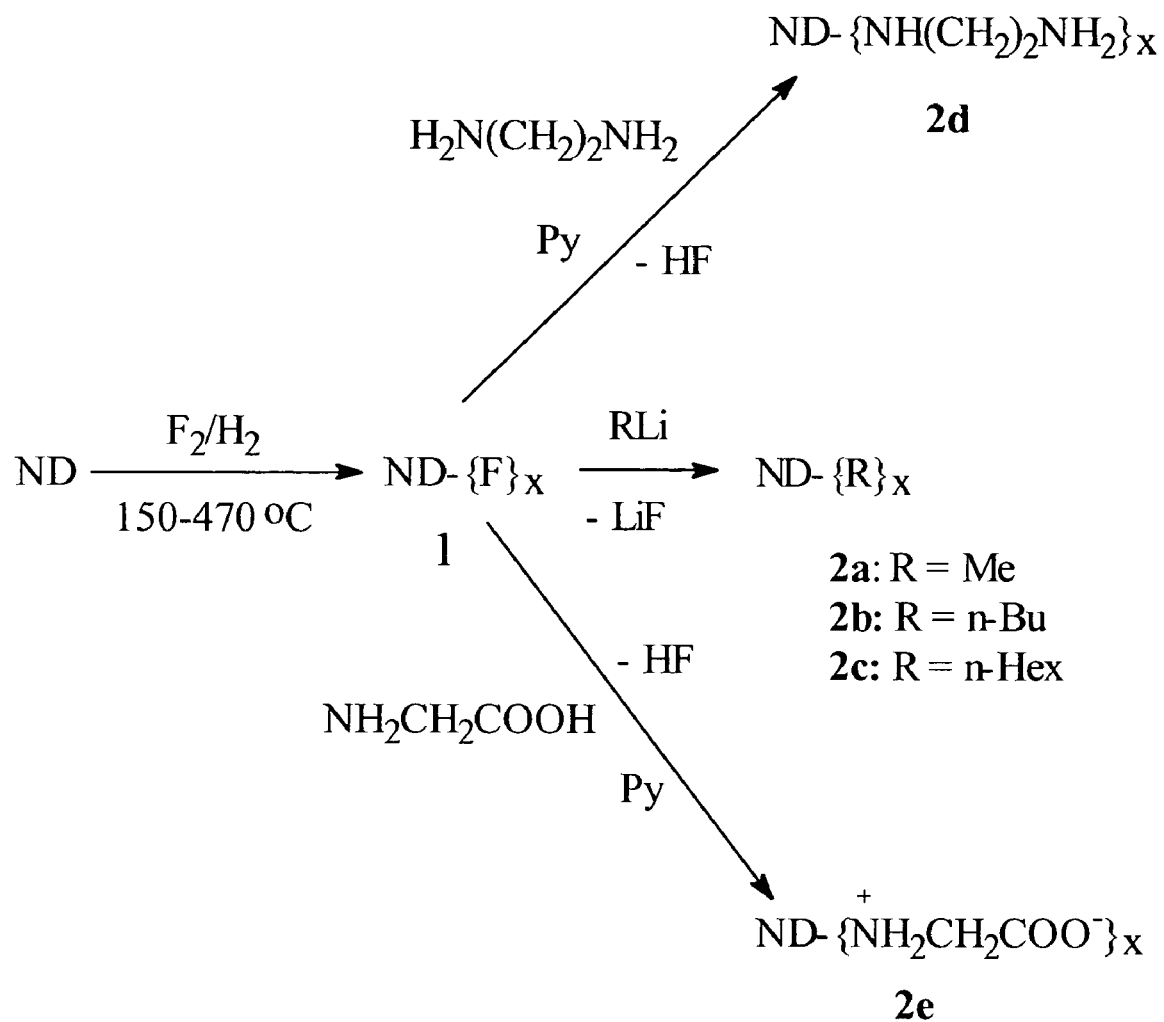
FIG. 9 schematically depicts the fluorination of nanodiamond powder and some of the subsequent chemistry that the fluorinated nanodiamond powder can undergo (Scheme 1).

Applicants describe herein the surface modification of nanoscale diamond powder through chemical treatment, first with a mixture of fluorine and hydrogen gases at elevated temperatures (150-470° C.), and then by reacting the resulting fluoronanodiamond (1) precursor with selected subsequent derivatizing agents (e.g., alkyllithium reagents, diamines and aminoacids) as illustrated in FIG. 9 (Scheme 1). The displacement of fluorine is accompanied by intermolecular elimination of LiF or HF in the course of these reactions and results in corresponding methyl-, n-butyl-, hexyl-, ethylene diamino-, and glycine-functionalized nanodiamond derivatives (2a-e), which all show improved solubility in comparison to the untreated nanodiamond.

Fluorination of Nanodiamond Powder

In comparison to recent fluorination studies of polycrystalline diamond powder (with mean particle sizes of about 1 micron) [Kealey et al., *J. Mater. Chem.* 2001, 11, 879; Touhara et al., *Carbon* 2000, 38, 241], the nanocrystalline diamond powder used in the methods of the present invention has tiny average particle sizes (~3.5 nm). The Brunauer, Emmet, Teller (BET) surface area measured for this as supplied ND powder material (245 $m^2/g$), is much higher than that for 1 micron-sized polycrystalline diamond (13-15 $m^2/g$). Also, unlike previous studies [Kealey et al., *J. Mater. Chem.* 2001, 11, 879; Touhara et al., *Carbon* 2000, 38, 241], the powder samples of the present invention were not pre-treated by hydrogenation or oxidation at high temperatures prior to fluorination. Accordingly, the fluorination reactions mainly involved the already existing surface functionalities which, while not intending to be bound by theory, are believed to be activated by the HF "catalyst" generated in situ.

Attenuated total reflectance-Fourier transform infrared (ATR-FTIR) spectroscopy analysis of the ND powder (FIG. 1A) reveals a strong absorption at 3420 $cm^{-1}$, medium intensity shoulder peaks in the 2800-3000 $cm^{-1}$ region, and bands at 1754, 1631, 1334, 1260, and 1115 $cm^{-1}$ due to the O—H, C—H, C=O, C=C and C—O stretching and bending deformation modes of the hydroxyl, carboxylic acid and the anhydride, carbonyl, CH and C=C surface functional groups. Energy dispersive analysis of X-rays (EDAX) yields about 10 wt. % oxygen content in the ND sample, which is consistent with the IR spectroscopy results showing the dominant presence of the oxygenated functionalities.

Fluorination of the ND powder at 150° C. results in a product having an IR spectrum (FIG. 1B) that is significantly different from that of the starting material, and suggesting that the fluorination of ND proceeds more readily at lower temperatures than does the fluorination of micron-sized diamond powders. The absorption due to the O—H stretches is seen around 3416 $cm^{-1}$ and is dramatically weakened in this spectrum, while new bands appear at 1865, 1800, and 1718 $cm^{-1}$, characteristic of the C=O stretchings of various F-substituted carbonyl groups [Roeges, N. P. G. *Guide to the Complete Interpretation of Infrared Spectra of Organic Structures*, Wiley Publ., Chichester, England, 1994] on the ND surface. New, strong peaks are also observed in the C—F stretch region at 1337, 1234, 1173, 1095, and 966 $cm^{-1}$. The absence of bands which belong to stretching vibrations of the C—H bonds should be particularly noted. This indicates that at 150° C. these bonds become entirely fluorinated. In accord with the IR data, EDAX analysis shows 5 at. % fluorine and a reduction in oxygen content to 1.2 at. % in the sample fluorinated at this temperature. At a higher temperatures (e.g., 310° C.), almost all O—H, C=O and C=C groups are removed or transformed by fluorination, resulting in a notable increase in peak intensity (FIG. 1C) of the C—F stretching vibrations in the 1100-1400 $cm^{-1}$ range [Ando et al., *Diamond Relat. Mater.* 1996, 5, 1021; Ando et al., *J. Chem. Soc., Faraday Trans.* 1993, 89, 3105; Touhara et al., *Carbon* 2000, 38, 241]. EDAX data indicates an increase of the fluorine content in the sample to 6.5 at. % which confirms the additional surface fluorination. Elevation of the fluorination temperature to 410° C. and 470° C. does not cause any significant changes (relative to the 310° C. fluorination) in the IR spectra of the resulting fluoronanodiamond samples. However, EDAX analysis of these samples shows a slight increase in the fluorine content, to 7.9 and 8.6 at. %, respectively, indicating that termination of the ND particle surface with fluorine has been completed at higher temperatures.

Figure 2:
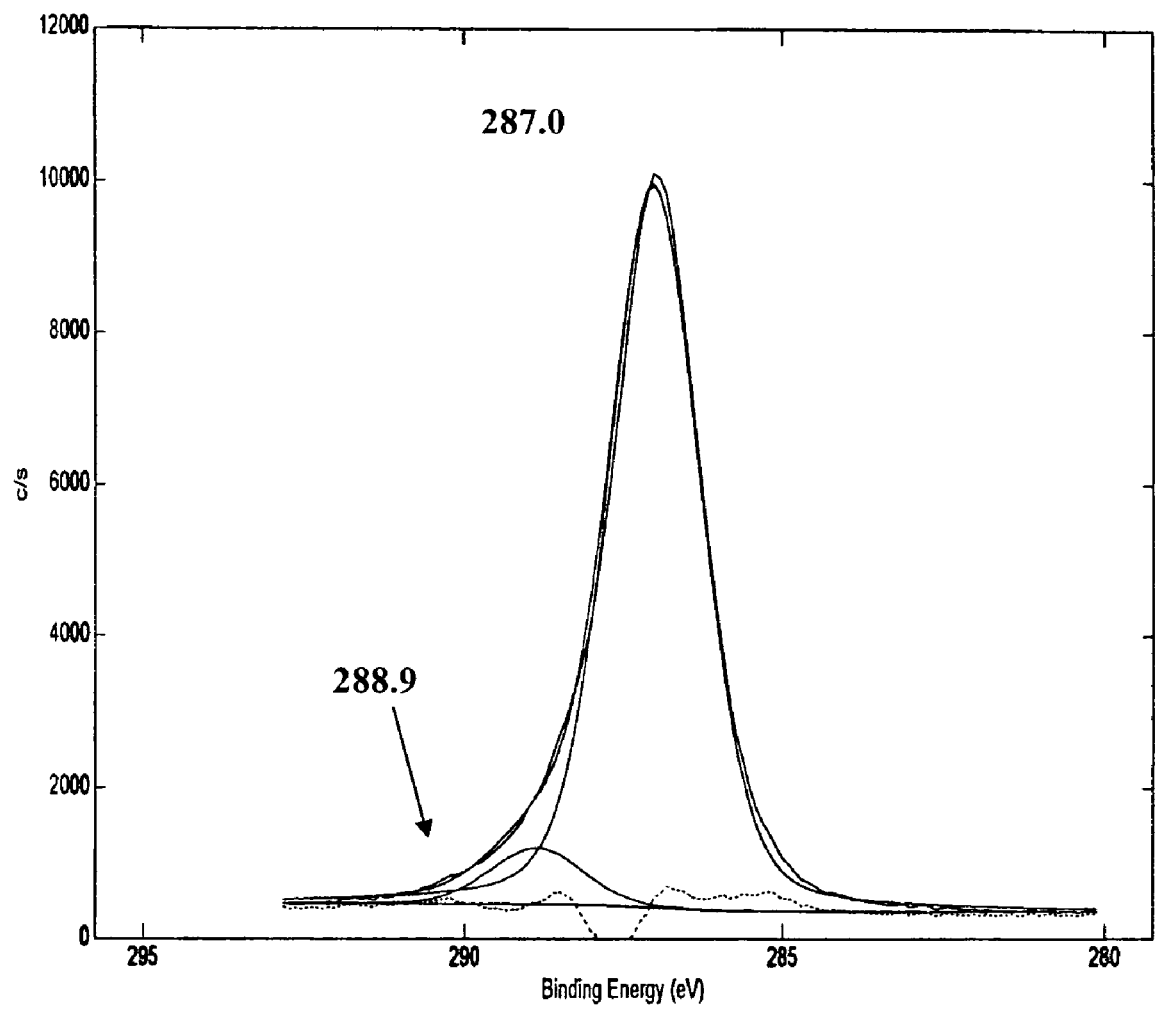
FIG. 2 depicts a deconvoluted C1s peak in the XPS spectrum of fluoronanodiamond 1.

X-ray photoelectron spectroscopy (XPS) studies, performed on the nanodiamond sample fluorinated at 310° C., confirm the formation of covalent C—F bonds and the fluorine content measured by EDAX analysis. The deconvolution of the C1s peak, shown in FIG. 2, results in two features. The major feature, observed at 287.0 eV, characterizes the $sp^3$-bonded carbons located at positions adjacent to fluorinated carbons. The minor component, occurring at 288.9 eV, can be assigned to the carbon atoms covalently bonded to fluorine [Touhara et al., Carbon 2000, 38, 241]. The presence surface oxygen in low amounts is also typically observed in the XPS survey spectrum. The binding energies for the carbon atoms in the fluoronanodiamond agree with the XPS data previously established for carbons located in the similar bonding environments in the fluorinated polycrystalline diamond powder [Kealey et al., J. Mater. Chem. 2001, 11, 879] and cage-like $C_{60}F_x$ (x=36, 48) derivatives [Kawasaki et al., J. Phys. Chem. B 1999, 103, 1223].

Figure 3:
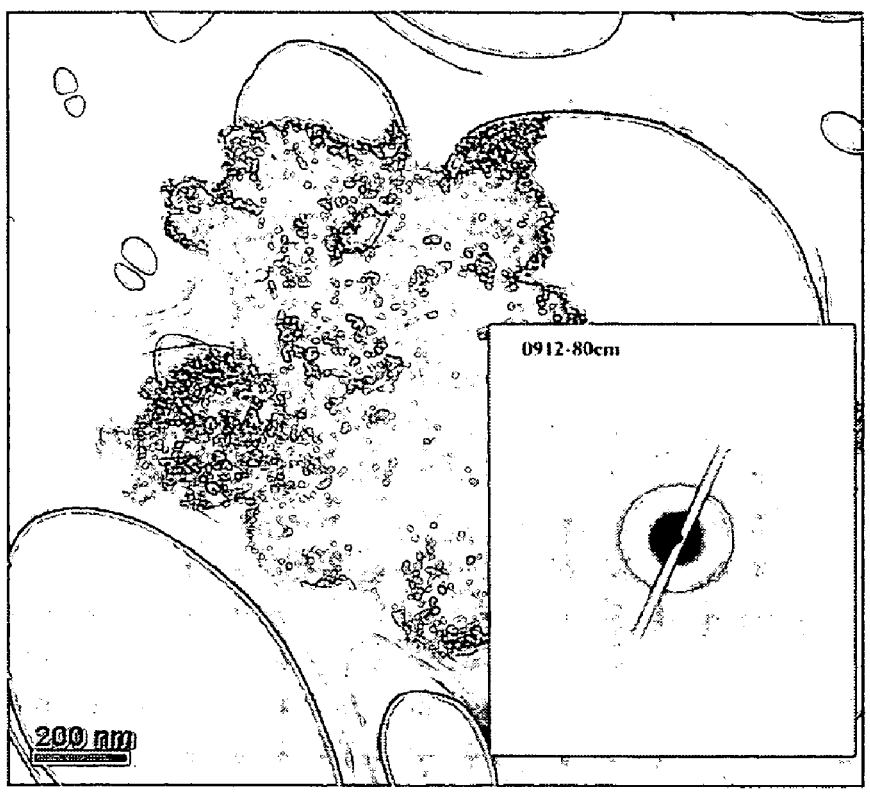
FIG. 3 depicts TEM images and corresponding SAD patterns (insets) of nanodiamond specimens taken before (A) and after fluorination at 310° C. (B)
Figure 3:
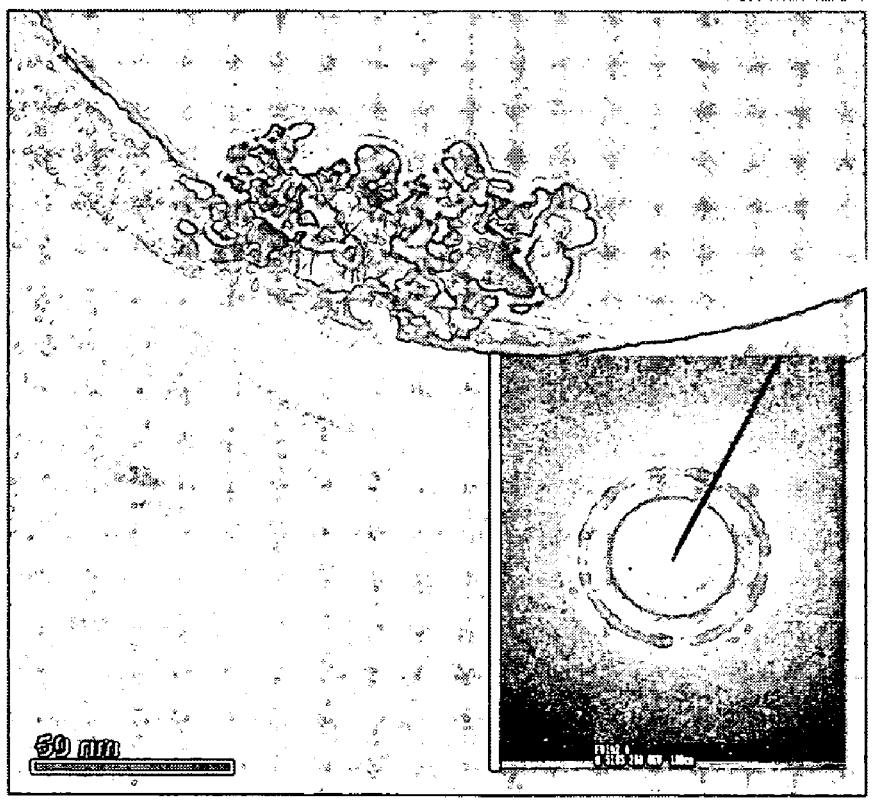
Figure 4:
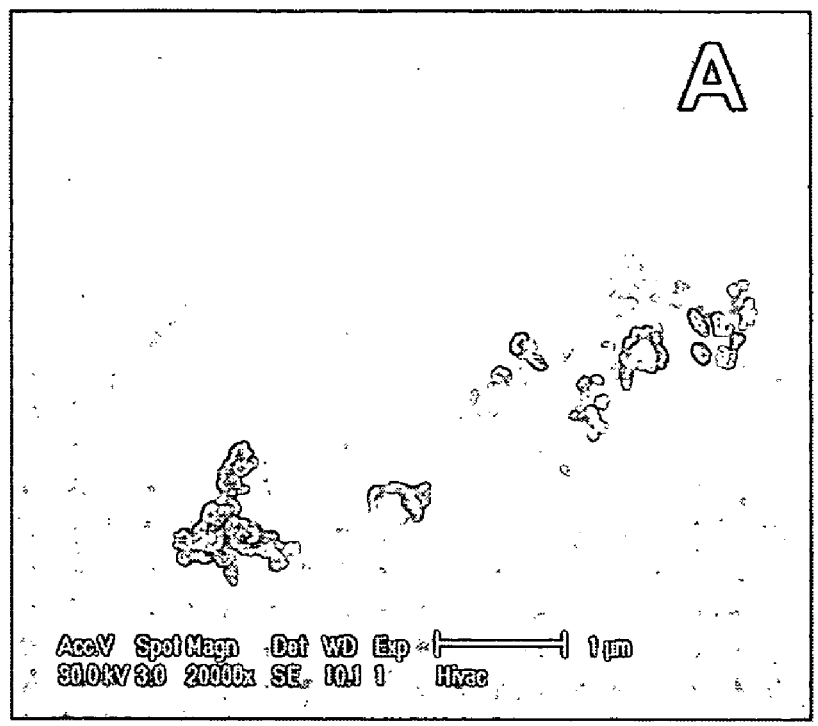
FIG. 4 depicts SEM images of nanodiamond samples taken before (A) and after fluorination (B)
Figure 4:
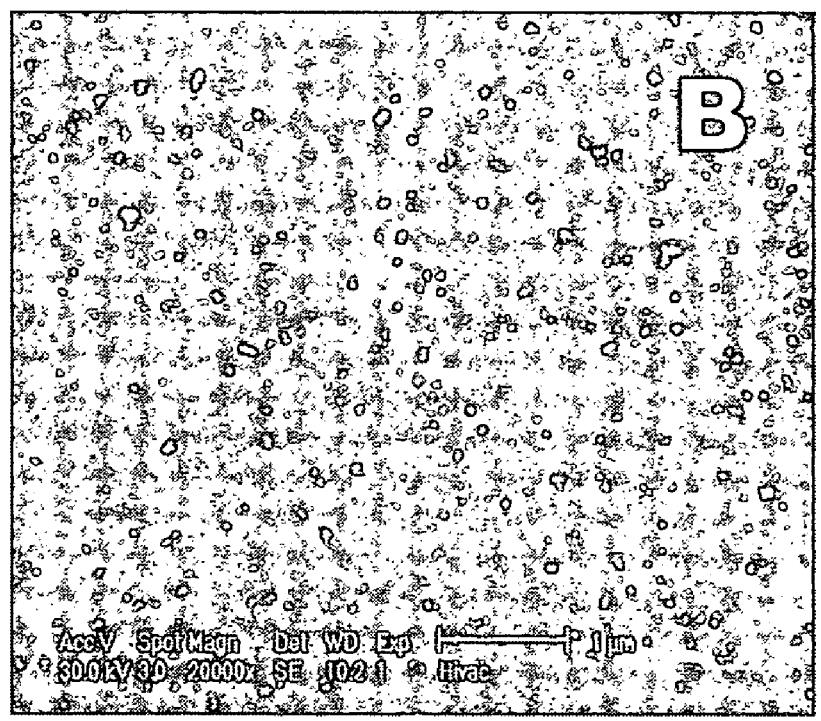

Transmission electron microscopy (TEM) images obtained for pristine ND powder and a fluoronanodiamond 1 specimen are compared in FIG. 3, where the pristine ND powder is shown in (A) and the fluoronanodiamond in (B). They show the identical selected area diffraction (SAD) patterns for both solids, which is typical for cubic nanocrystalline diamond, and which indicates that the fluorination has modified only the nanodiamond surface leaving the particle core structure intact. However, a comparison of TEM images A and B shows that the surface modification dramatically affects the aggregate particle size, which after fluorination undergoes a greater than 10-fold reduction: from the micron scale to the tens of nanometers scale. Similarly, the aggregate particle size reduction by surface fluorination can also be observed by scanning electron microscopy (SEM) imaging of the solid samples deposited on copper substrates from sonicated powder suspensions in ethanol. The pristine ND clusters (FIG. 4A) appear to be drastically deagglomerated after transformation into fluoronanodiamond which is shown to comprise tiny nanoparticles (FIG. 4B).

Derivatization of Fluoronanodiamond

Applicants have found that, similar to recently studied fluoronanotube derivatization reactions [Khabashesku et al., Acc. Chem. Res. 2002, 35, 1087; Khabashesku, V. N. Chemistry of Carbon Nanotubes in Encyclopedia of Nanoscience and Nanotechnology, Ed. S. Nalwa, American Scientific Publishers, Los Angeles, 2004, Vol. 1, p. 849], the C—F bonds in fluoronanodiamond 1 can also react with strong nucleophilic reagents, to produce new nanodiamond derivatives. Thus, interactions of 1 with the alkyllithium reagents RLi (R=$CH_3$, n-$C_4H_9$, n-$C_6H_{13}$) lead to methyl-, n-butyl-, and hexyl-nanodiamond derivatives 2a-c, respectively, while reactions with ethylene diamine and glycine ethyl ester hydrochloride result in amino-nanodiamond (2d) and glycine-nanodiamond (2e) (Scheme 1, FIG. 9). The efficiency of fluorine substitution in 1 and covalent attachment of new functional groups to nanodiamond have been evidenced by a set of several materials characterization data.

Figure 5:
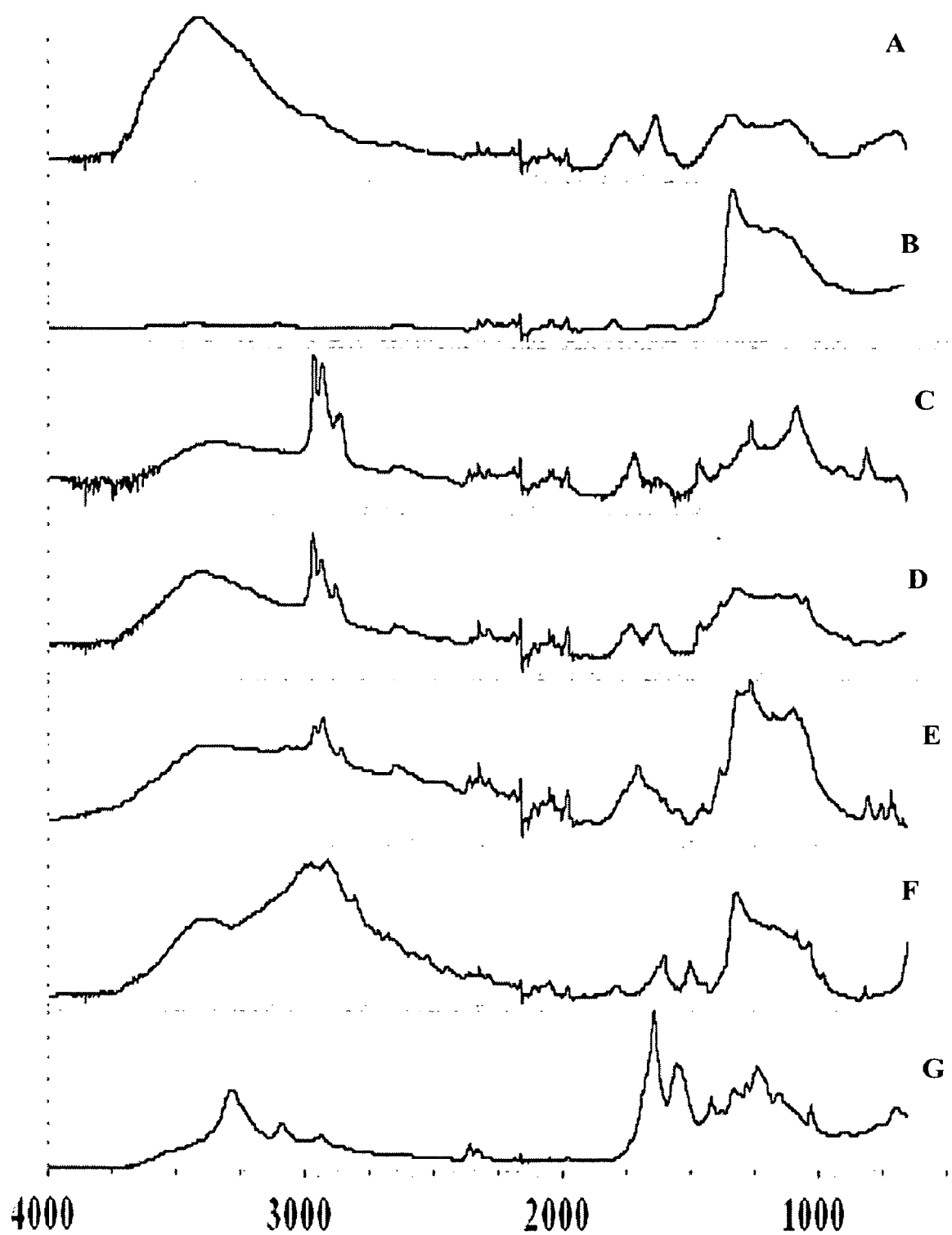
FIG. 5 depicts ATR-FTIR spectra of nanodiamond derivatives 2a (A), 2b (B), 2c(C), 2d (D), and 2e (E)

EDAX analyses of nanodiamond derivatives 2a-e yield almost zero fluorine content in alkyl-nanodiamonds 2a-c and no more than 1 at. % in 2d and 2e, which indicates the efficient displacement of fluorine in 1 and is also in line with the relative nucleophilicity of the reagents studied. The evidence for covalent attachment of new functional groups instead of fluorine is provided by the ATR-IR spectra of 2a-e shown on FIG. 5. In these spectra the peaks of the C—F stretching vibrations observed for 1, are absent. Instead, after performing reactions with each of the nucleophilic reagents studied, new prominent peaks appear in the 2800-2980 $cm^{-1}$ and 800-1450 $cm^{-1}$ spectral regions due to the C—H stretching and deformation modes that result from substitution of fluorine by organic functional moieties. In the spectrum of amino-nanodiamond 2d (FIG. 5D), an additional broad peak at 3360-3400 $cm^{-1}$ and a medium intensity peak at 1630 $cm^{-1}$ can be related to the N—H stretches and $NH_2$ scissor motion, respectively, of N-ethylene amino group attached to the nanodiamond surface. The IR spectrum of glycine-nanodiamond 2e indicates that the ethyl ester protecting group has been removed during the derivatization reaction, since the band corresponding to the ester carbonyl stretch is absent and spectral features of the covalently attached glycine amino acid appear in the range typical for the zwitterionic structure (—$NH_2^+CH_2COO^-$) of this moiety [The Aldrich Library of Infrared Spectra, Second Edition. Ed. C. J. Pouchert, Milwaukee, Wis., 1975]. This is evidenced by the observation of asymmetric and symmetric N—H stretches at 3280 and 3088 $cm^{-1}$, respectively, and of the bands of carboxylate anion stretching modes at 1642 and 1554 $cm^{-1}$.

Figure 6:
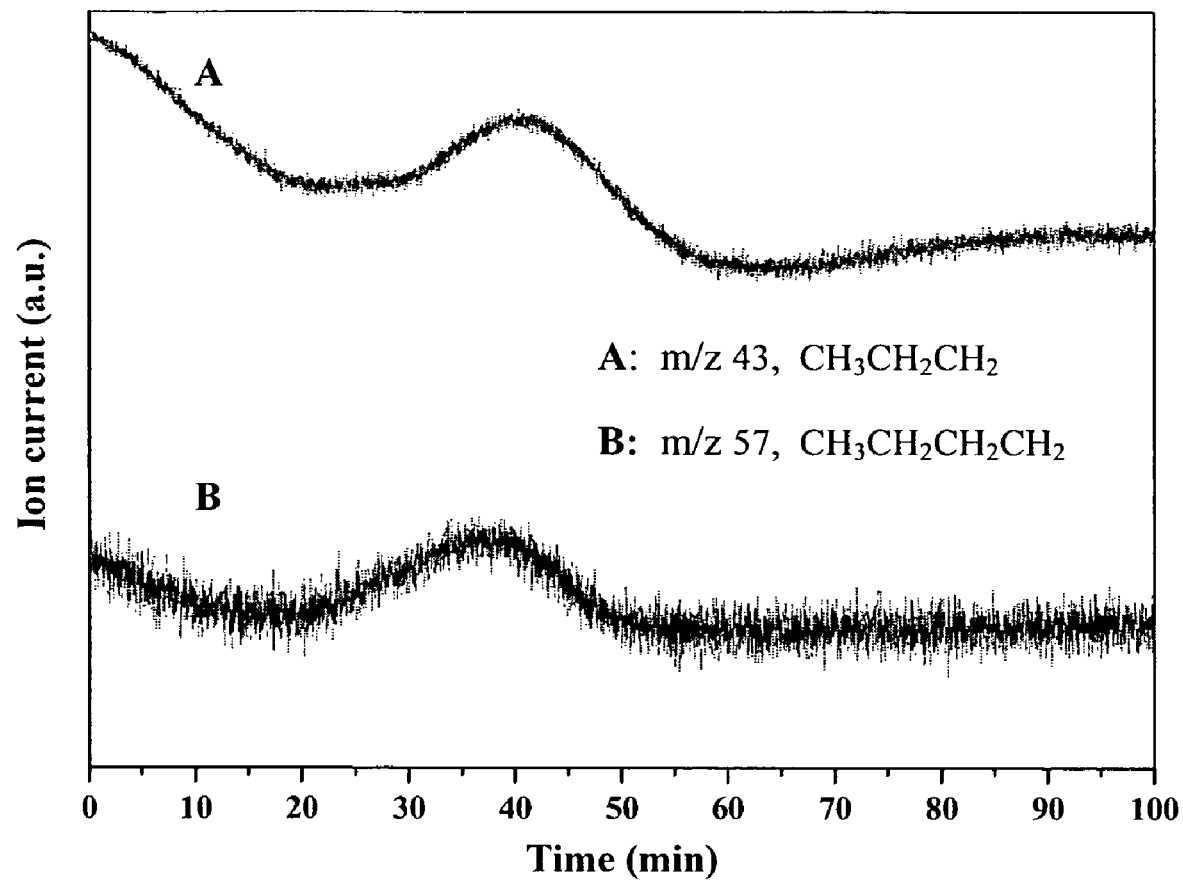
FIG. 6 depicts ion current vs. time (temperature) curves from thermal degradation TG-MS studies of hexyl-nanodiamond 2e.

Thermal gravimetric analysis (TGA) coupled with the on-line monitoring of volatile products by a mass spectrometer (MS) provides further evidence for covalent surface functionalization of nanodiamond. The TGA-MS experiment was carried out with 30 mg of hexyl-nanodiamond 2c placed into a TGA pen and heated at 10° C./min to 600° C. in the flow of argon. The ion current vs. time curves for the ions originating from the evoluted products detaching from the 2c hexyl groups are presented on FIG. 6. The A and B evolution curves were obtained for the detaching fragments observed at m/z=57 ($CH_3CH_2CH_2CH_2$) and m/z=43 ($CH_3CH_2CH_2$), respectively. Each curve exhibits a peak in the 250-400° C. range. The appearance of these peaks at such high temperatures indicates that this is not caused by the evolution of physisorbed species. These peaks also appear at the same temperature which indicates that both fragments originate from the same parent molecular ion. Although the heavier fragment ions of hexane, such as those at m/z 85 and 71, were not clearly detected because of the limited sensitivity of the mass spectrometer, the identification of hexane is supported by literature data showing that the ions with m/z 57 and 43 are the most abundant in the mass spectrum of hexane [Stenhagen, E.; Abrahamsson, S.; McLafferty, F. W. Atlas of Mass Spectral Data, Interscience Publ., 1969, Vol. 1].

Figure 7:
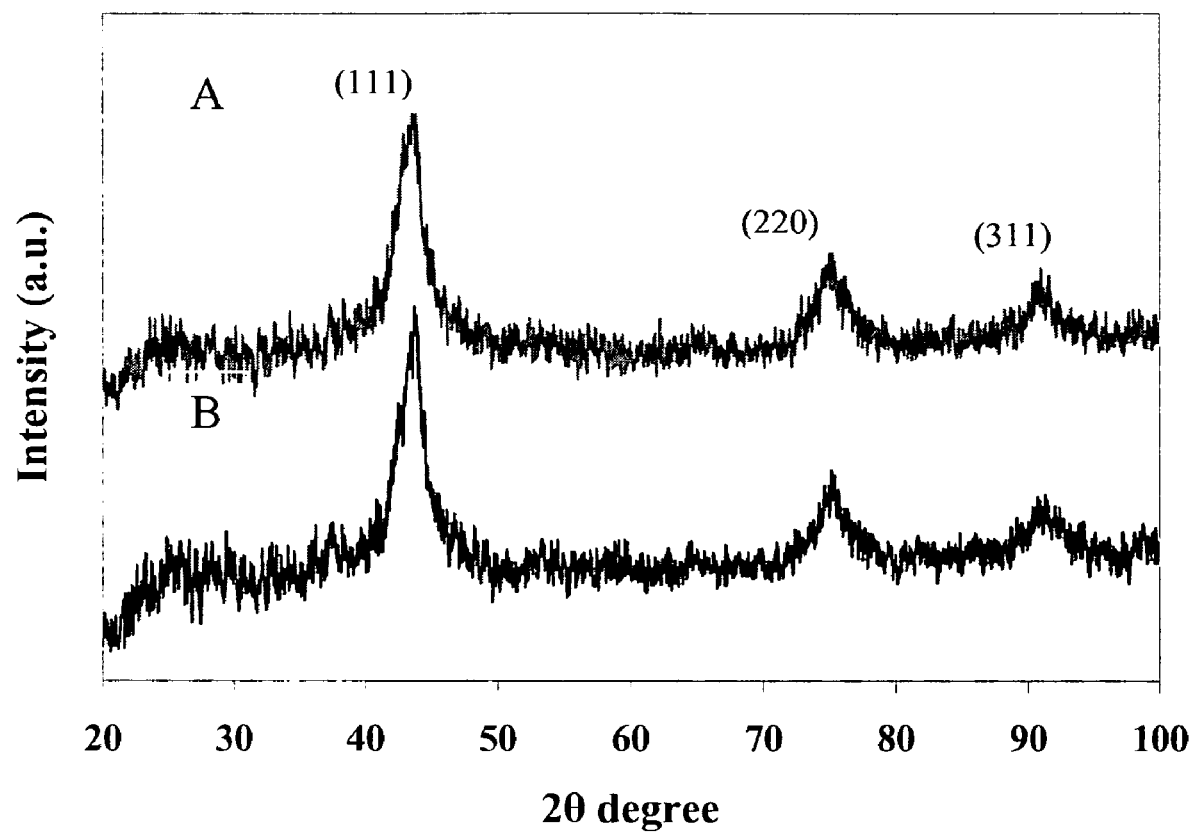
FIG. 7 depicts XRD patterns of nanodiamond powder (A) and hexyl-nanodiamond 2c (B)

While not intending to be bound by theory, the subsequent derivatizations of fluoronanodiamond described herein most likely involve only the surface chemical bonds and are not believed to affect the underlying crystalline structure. For instance, the cubic X-ray diffraction (XRD) pattern of the nanodiamond powder, shown on FIG. 7A, remains virtually unchanged by the derivatization reactions, which is in agreement with the identical micro-diffraction patterns observed in the TEM of ND and functionalized ND 1 (FIG. 3). This is also demonstrated by the XRD "fingerprints" of hexyl-nanodiamond 2c taken as an example (FIG. 7B). The average size of nanocrystals (~3.5 nm) in ND powder, estimated from the half-widths of XRD peaks by using Scherrer's equation [see, e.g., B. D. Cullity, Elements of X-Ray Diffraction, Second Edition (Boston: Addison-Wesley, 1978), p. 102], is not affected by the surface chemical functionalization, e.g., the 2c derivative. TEM images (FIG. 3) also show the cluster-like specimen of these powders comprising tiny (~3-5 nm) sphere-shaped nanocrystals.

Solubility

Pristine nanodiamond powder is almost always regarded as being insoluble in most common solvents since complete precipitation of all dispersed particles from some solutions is generally observed after a few hours. Applicants have demonstrated that the solubility of such nanodiamond can be significantly improved through functionalization. The suspension/solutions formed can stand without any precipitation for several weeks or even longer at reduced concentrations. Quantitative estimation of the solvation of functionalized nanodiamonds was performed for derivatives 1 and 2c by dispersing 20 mg of these derivatives in 200 ml of selected solvent by sonicating for 2 hours. Thereafter, the dispersion formed was left to settle for 2 days. The top 150 ml of the solution, comprising the most "dissolved" sample, was decanted and the solvent evaporated. The obtained solid residue was weighed and the solubility calculated in mg/L. The solubility data obtained for 1 and 2c, compared to those similarly produced for pristine ND, are presented in Table 1. Such data shows that tetrahydrofuran (THF) is the best solvent (among those tried) for fluoronanodiamond, while alcohols (ethanol and iso-propanol) can serve as good solvents for both functionalized nanodiamonds, 1 and 2c, forming suspension/solutions stable for many weeks without any visible precipitation. However, the same organic solvents, listed in Table 1, provide a less stable suspension media for pristine ND. After 2 hours of sonication, complete precipitation of ND is observed from acetone within just a few hours, and can take longer (~72 hours) when other polar solvents are used (Table 1).

TABLE 1

Solubility (mg/L) of pristine ND and fluoro- and hexyl-nanodiamond derivatives in organic solvents.

| Solvent | Pristine ND | fluoro-ND (1) | hexyl-ND (2c) |
|---|---|---|---|
| Ethanol | 22.5 | 47.5 | 55.6 |
| iso-Propanol | 27.5 | 42.5 | 49.4 |
| THF | 6.2 | 55.0 | 26.3 |
| Acetone | 0 | 30.0 | 31.3 |
| Chloroform | 5.0 | 43.8 | 32.5 |

Figure 8:
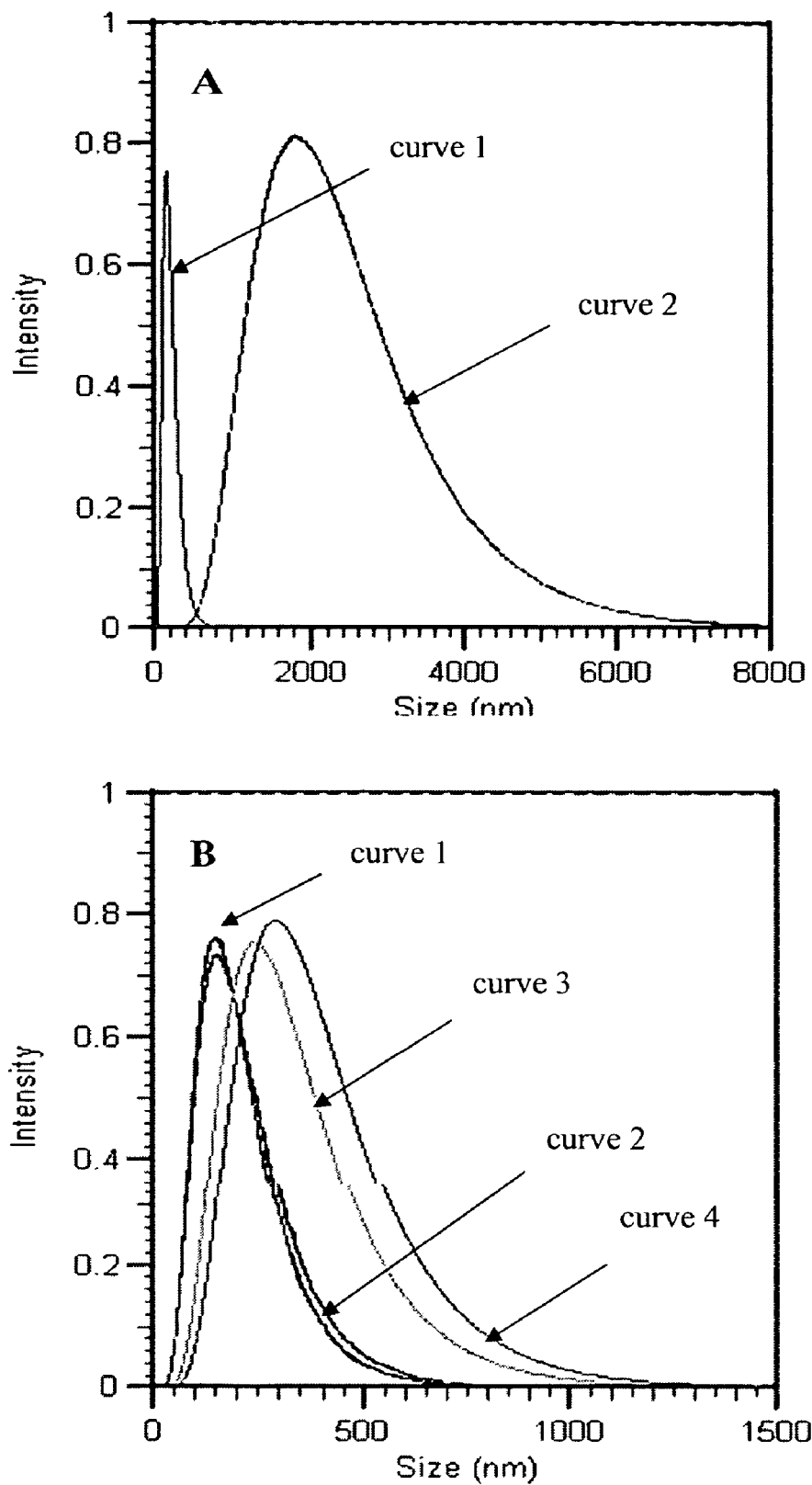
FIG. 8 depicts DLS particle size distribution curves for ethanol suspensions/solutions of pristine nanodiamond powder and fluoronanodiamond (A), and nanodiamond derivatives 1, and 2c-e (B)

Applicants have also found that fluorination and subsequent derivatization chemical processing of nanodiamond powder can assist in reducing the agglomeration of clusters in the solution phase. This effect has been observed by dynamic light scattering (DLS) measurements of the particle size distribution in ethanol suspension/solutions of pristine nanodiamond and its derivatives 1 and 2c-e after 2 hours of sonication. The measured size distribution curves are shown on FIG. 8. Referring to FIG. 8A, comparison of the curves obtained for pristine nanodiamond (curve 2) and fluoronanodiamond (curve 1) solutions demonstrate a more than 10 times mean aggregated particle size (APS) reduction due to surface bonded fluorine, from 1930 nm in ND to 160 nm in 1. Referring to FIG. 8B, the substitution of fluorine by non-polar hexyl groups does not significantly change the APS distribution (relative to 1), yielding a mean size value of 168 nm for 2c (curve 3). However, introduction of polar groups capable of dipole-dipole and hydrogen bonding interactions facilitate the enlargement of mean APS to 262 nm in the amino-nanodiamond 2d (curve 4) and to 310, nm in the glycine-nanodiamond 2e (curve 5), as compared to fluoronanodiamond (FIG. 8B). Nevertheless, for all functionalized nanodiamonds, the mean APS in solutions are generally found to be at least 6 to 12 times smaller than for pristine nanodiamond suspensions. The solvation and cluster size properties, improved by the functionalization routes described herein, will certainly help to extend the applications of nanodiamond powder to many new nanoengineering and bio-medical areas.

Variations in the above described embodiments could include subsequent derivatization of the pristine ND powder using chemical routes that involve the surface functional moieties present as a result of ND processing. Such functional moieties can include, but are not limited to, —OH, —COOH, —SO$_3$H, and —NH$_2$.

Applicants have demonstrated efficient two-step methods for covalent surface functionalization of commercially-available nanoscale diamond powders via fluorination and subsequent derivatization with a number of functional groups. The direct fluorination procedure for nanodiamond, developed in the present work, utilizes relatively low temperatures (150-310° C.) and does not require a pre-treatment of the powder by hydrogen at substantially higher temperatures. The product of direct fluorination, fluoronanodiamond, is soluble in organic polar solvents and can be used as a precursor for further surface modification through wet chemistry fluorine substitution reactions with nucleophilic reagents., e.g., terminal amino and carboxyl groups in the derivatives 2d and 2e, can serve as binding sites for integration into epoxy polymer composites used for hardened corrosion resistant coatings. The improved solubility of the functionalized nanodiamonds will facilitate these engineering applications as well as bio-medical applications through the attachment of more complex molecules (such as proteins and DNA). The solvation and reduced agglomeration of nanodiamond particles achieved through the surface functionalization described herein strongly encourage further studies of the chemistry and properties of nanodiamond powder.

The following Examples are provided to demonstrate particular embodiments of the present invention. It should be appreciated by those of skill in the art that the methods disclosed in the Examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

This Example serves to illustrate some exemplary precursor materials, such materials being used in subsequent Examples.

Nanodiamond powder with phase purity higher than 97% (<2.5% graphite and amorphous carbon, 0.1-0.15% Fe, 0.1-0.3% Si) and particle sizes ranging from 3.5 to 6.5 nm was obtained from Nanostructured and Amorphous Materials, Inc. The alkyllithium reagents (2 M solutions in diethyl ether, cyclohexane or hexane), ethylene diamine and glycine ethyl ester hydrochloride were supplied by Aldrich. Fluorine was purchased from Spectra Gases.

EXAMPLE 2

This Example serves to illustrate how nanodiamond powder can be fluorinated in accordance with some embodiments of the present invention.

In a typical fluorination process, 200 mg of nanodiamond powder was placed into a monel reactor that was continuously purged with helium. The reactor was heated by a temperature-controlled hot plate to a selected temperature, 150, 310, 410 or 470° C., and then the loaded sample was annealed at that temperature for about 3-4 hours. After that, fluorine and hydrogen gases were separately introduced into the reactor at a controlled 3:1 flow rate ratio. The purpose of using hydrogen in the process was to generate HF in situ, which is thought to catalyze the fluorination reaction of surface functional groups on nanodiamond. The fluorination was continued for 48 hours. Thereafter, the reactor was cooled to room temperature, flows of hydrogen and fluorine gases were stopped, and the resulting grey-colored fine powder (fluoronanodiamond 1) was unloaded from the reactor. The weight of the material produced at each fluorination temperature was essentially the same, about 195 mg.

EXAMPLE 3

This Example serves to illustrate how fluorinated nanodiamond powder can be used for subsequent functionalizations.

Fluorinated nanodiamond powder was used as a precursor for subsequent functionalizations via reactions with several types of organic nucleophilic reagents: alkyllithium compounds, diamines, and aminoacids. For preparation of alkyl-nanodiamond derivatives 2a-c, e.g., hexyl-nanodiamond (2c), 50 mg of 1 was added to 50 ml of dry hexane in a 250 ml flask under nitrogen atmosphere. The contents were sonicated with 17 W/55 kHz Cole Palmer bath ultrasonicator for 5 minutes and then cooled in ice. Thereafter, 10 ml of hexyl-lithium reagent (2.3 M solution in dry hexane) was added dropwise to the resulting suspension and the mixture was sonicated for 20 minutes followed by stirring overnight under nitrogen and then cooling in ice. The unreacted hexyllithium was quenched by slow addition of ethanol while stirring. After that, water was added to dissolve the salts formed. The powder product was filtered and re-suspended in 3 N HCl by sonication for 10 minutes. Finally, the nanodiamond derivative 2c was filtered, washed with plenty of water and ethanol, and then dried in a vacuum oven at 70° C. for 12 hours to yield a fine light-brown powder. Metyl- and n-butyl-nanodiamond derivatives, 2a and 2b, respectively, were prepared via a similar procedure.

EXAMPLE 4

This Example serves to illustrate how an amino-nanodiamond derivative can be prepared from fluorinated nanodiamond.

Amino-nanodiamond derivative (2d) was prepared by refluxing 50 mg of 1 in 50 ml of anhydrous ethylenediamine in the presence of pyridine (py) at about 130° C. for 24 hours under a nitrogen atmosphere. After cooling the mixture down to room temperature, the final product was filtered, washed with plenty of water and ethanol, and then dried in vacuum oven at 70° C. overnight yielding a dark-brown powder of 2d.

EXAMPLE 5

This Example serves to illustrate how an amino acid-nanodiamond derivative can be prepared from fluorinated nanodiamond.

For preparation of glycine-nanodiamond derivative (2e), 50 mg of 1 was sonicated in 100 ml of o-dichlorobenzene (ODCB) for 20-30 minutes, then 200 mg of glycine ethyl ester hydrochloride and several drops of pyridine were added and the mixture was stirred at ~130-140° C. for 8-12 hours. The resulting black-colored product 2e was filtered, washed with a large amount of ethanol, and vacuum dried at 70° C. overnight.

EXAMPLE 6

This Example serves to illustrate how functionalized nanodiamond powder can be characterized.

Pristine nanodiamond powder and the derivatives 2a-e were characterized by using a series of available materials characterization methods: ATR-FTIR, XRD, XPS, TGA and TG-MS, SEM/EDX, TEM, and dynamic light scattering (DLS) analyses. The ATR-FTIR spectral measurements were done using a Thermo Nicolet Nexus 670 FTIR system with an ATR accessory. X-ray diffraction data were collected on a GADDS powder diffractometer equipped with a Cu K$\alpha$ radiation source. XPS data was obtained with a Physical Electronics PHI 7500 X-ray photoelectron spectrometer using an Al K$\alpha$ radiation source (1486.6 eV) with a power setting of 350 W and an analyzer pass energy of 23.5 eV. The thermal degradation analyses were performed with a TA-SDT-2960 TGA-DTA analyzer. The gaseous and volatile products formed were identified with TG-MS using a TA Q-series 500 instrument coupled to a Pfeiffer Thermostar quadrupole mass spectrometer. Argon was used in the TG-MS runs as a purge gas.

SEM was performed at 30 kV beam energy using a Phillips XL-30 field emission microscope equipped with an energy dispersive X-ray (EDAX) analyzer. TEM photoimages of the specimen, placed on lacey carbon coated copper grids (size 200 mesh), were obtained with a JEOL JEM-2010 electron microscope operating at an accelerating voltage of 100 kV. Measurements of the particle size distribution in the solutions were performed using a Coulter N4 PLUS DLS instrument.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A functionalized nanodiamond powder,
   wherein the surface of the functionalized nanodiamond powder is derivatized with fluorine;
   wherein the functionalized nanodiamond powder comprises at least 5 atomic percent fluorine; and
   wherein the functionalized diamond powder exhibits greater than 10-fold reduced particle agglomeration relative to pristine nanodiamond.

2. The functionalized nanodiamond powder of claim 1, wherein the functionalized nanodiamond powder has a mean particle size between about 2 nm and about 10 nm.

3. A method comprising:
   a) providing a quantity of nanodiamond powder;
   b) fluorinating the surface of the nanodiamond powder to yield a fluorinated nanodiamond powder, wherein fluorinating comprises:

(i) contacting the nanodiamond powder with $F_2$ gas; and
(ii) adding $H_2$ gas in a substoichiometric amount to form HF.

4. The method of claim 3, wherein the nanodiamond powder has a mean particle diameter between about 2 nm and about 10 nm.

5. The method of claim 3, wherein fluorinating is carried out at a reaction temperature between about 50° C. and about 500° C.

6. The method of claim 3, wherein fluorinating is carried out for a duration between about 60 minutes and about 2 days.

7. The method of claim 3, wherein the fluorinated nanodiamond powder comprises at least 5 atomic percent fluorine.

8. The method of claim 3, further comprising:
defluorinating the fluorinated nanodiamond powder.

9. The method of claim 8, wherein defluorinating comprises a reaction of the fluorinated nanodiamond powder with hydrazine.

10. The method of claim 3, further comprising:
reacting the fluorinated nanodiamond powder with a subsequent derivatizing agent selected from the group consisting of alkyllithium species, Grignard reagents, amines, diamines, amino acids, and combinations thereof;
wherein a subsequently derivatized nanodiamond powder is formed after reacting.

11. The method of claim 10, wherein the subsequently derivatized nanodiamond powder comprises functional moieties selected from the group consisting of fluorine atoms, alkyl species, amino species, amino acid species, and combinations thereof.

12. The method of claim 10, further comprising:
blending the subsequently derivatized nanodiamond powder with a polymeric material.

13. The method of claim 10, further comprising:
defunctionalizing the subsequently derivatized nanodiamond powder.

14. The method of claim 13, wherein defunctionalizing comprises a thermolysis of the subsequently derivatized nanodiamond powder in an inert atmosphere.

15. The method of claim 14, wherein the thermolysis is conducted at a temperature between 25° C. and 800° C.

16. A stable dispersion comprising functionalized nanodiamond dispersed in a solvent, wherein the functionalized nanodiamond exhibits greater than 10-fold reduced particle agglomeration relative to pristine nanodiamond.

17. The stable dispersion of claim 16, wherein the dispersion is stable in excess of two weeks.

18. The stable dispersion of claim 16, wherein the functionalized nanodiamond has a mean crystallite diameter in a range of 2 nm to 10 nm.

19. The stable dispersion of claim 16, wherein the functionalized nanodiamond comprises surface functional moieties selected from the group consisting of fluorine atoms, alkyl species, amino species, amino acid species, and combinations thereof.

20. The stable dispersion of claim 16, wherein the solvent is selected from the group consisting of ethanol, iso-propanol, THF, acetone, chloroform, and combinations thereof.

21. The stable dispersion of claim 20, wherein the functionalized nanodiamond has a solubility in excess of 30 mg/L.

22. The stable dispersion of claim 20, wherein the functionalized nanodiamond has a solubility in excess of 40 mg/L.

23. The stable dispersion of claim 20, wherein the functionalized nanodiamond has a solubility in excess of 50 mg/L.

24. A method comprising:
a) fluorinating a diamond surface to form a fluorinated diamond surface, wherein fluorinating comprises:
(i) contacting the diamond surface with $F_2$ gas; and
(ii) adding $H_2$ gas in a substoichiometric amount to form HF; and
b) reacting the fluorinated diamond surface with a subsequent derivatizing agent to yield a subsequently derivatized diamond surface.

25. The method of claim 24, wherein fluorinating is carried out at a reaction temperature between about 50° C. and about 500° C.

26. The method of claim 24, wherein fluorinating is carried out for a duration between about 60 minutes and about 2 days.

27. A derivatized nanodiamond powder, comprising a nanodiamond particle surface derivatized with functional moieties selected from the group consisting of alkyl species, amino species, amino acid species, and combinations thereof and further comprising fluorine atoms on the nanodiamond particle surface.

* * * * *

UNITED STATES PATENT AND TRADEMARK OFFICE
CERTIFICATE OF CORRECTION

PATENT NO. : 7,820,130 B2  
APPLICATION NO. : 10/996869  
DATED : October 26, 2010  
INVENTOR(S) : Valery N. Khabashesku et al.

Page 1 of 1

It is certified that error appears in the above-identified patent and that said Letters Patent is hereby corrected as shown below:

Column 1, between lines 11 and 12: add "STATEMENT REGARDING FEDERALLY SPONSORED RESEARCH"

Column 1, lines 12-15: replace [The present invention was made with support from the Texas Higher Education Coordinating Board's Advanced Technology Program, Grant No. 003604-026-2001; and the Robert A. Welch Foundation, Grant No. C-0109] with "This invention was made with Government support under Grant No. NCC1-02038 awarded by the National Aeronautics and Space Administration. The Government has certain rights in this invention."

Signed and Sealed this  
First Day of May, 2012

David J. Kappos  
*Director of the United States Patent and Trademark Office*